United States Patent [19]

Hamilton

[11] Patent Number: 5,321,937
[45] Date of Patent: Jun. 21, 1994

[54] HORSE HEAD PROTECTOR

[76] Inventor: James H. Hamilton, Rt. 9, Box 596, Lake City, Fla. 32055

[21] Appl. No.: 51,778

[22] Filed: Apr. 26, 1993

[51] Int. Cl.⁵ .................................. B68B 7/00
[52] U.S. Cl. ..................................... 54/80.2
[58] Field of Search ............... 54/80.1, 80.2, 80.5

[56] References Cited

U.S. PATENT DOCUMENTS

| 481,152 | 8/1892 | Steele | 54/80.2 |
| 2,407,029 | 9/1946 | Miller | 54/80.2 |
| 4,581,877 | 4/1986 | Wilber | 54/80.2 |

FOREIGN PATENT DOCUMENTS 10388 of 1913 United Kingdom ............... 54/80.2

Primary Examiner—Robert P. Swiatek
Attorney, Agent, or Firm—E. Michael Combs

[57] ABSTRACT

A flexible web formed of a shape retentive material includes a convex head web having a first end spaced from a second end, with the second end including a convex snout web extending from the second end canted relative to the second end for positioning about the facial portion between a horse's eyes, with strap members arranged to secure the head and snout web about the horse's head. The head web and the snout web each include individual strap portions for securement of the primary flexible web about a horse's head to prevent injury to the horse during loading and unloading of the horse relative to trailers for transport of the horse.

2 Claims, 4 Drawing Sheets

HORSE HEAD PROTECTOR

BACKGROUND OF THE INVENTION

1. Field of the Invention

The field of invention relates to horse head securement structure, and more particularly pertains to a new and improved horse head protector wherein the same is arranged to afford protection to a horse's head and facial regions.

2. Description of the Prior Art

Contemporary transport of horses requires the horses to be loaded and unloaded relative to a trailer structure. Frequently, a horse will rear or jerk its head relative to the loading and unloading procedure effecting injury to the horse requiring medical attention. To prevent the horse from effecting such injury upon contact with a framework of an associated trailer, the horse head protector structure of the instant invention is directed to the covering of the horse's head and facial region. Prior art horse head gear is typically related to harness and bridle structure such as indicated in U.S. Pat. Nos. 4,631,906; 3,765,151; and 4,774,801.

SUMMARY OF THE INVENTION

In view of the foregoing disadvantages inherent in the known types of horse head gear structure now present in the prior art, the present invention provides a horse head protector wherein the same is directed to the covering of a horse's head and facial region to afford protection thereof. As such, the general purpose of the present invention, which will be described subsequently in greater detail, is to provide a new and improved horse head protector which has all the advantages of the prior art horse head gear structure and none of the disadvantages.

To attain this, the present invention provides a flexible web formed of a shape retentive material including a convex head web having a first end spaced from a second end, with the second end including a convex snout web extending from the second end canted relative to the second end for positioning about the facial portion between a horse's eyes, with strap members arranged to secure the head and snout web about the horse's head. The head web and the snout web each include individual strap portions for securement of the primary flexible web about a horse's head to prevent injury to the horse during loading and unloading of the horse relative to trailers for transport of the horse.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved horse head protector which has all the advantages of the prior art horse head gear structure and none of the disadvantages.

It is another object of the present invention to provide a new and improved horse head protector which may be easily and efficiently manufactured and marketed.

It is a further object of the present invention to provide a new and improved horse head protector which is of a durable and reliable construction.

An even further object of the present invention is to provide a new and improved horse head protector which is susceptible of a low cost of manufacture with regard to both materials and labor, and which accordingly is then susceptible of low prices of sale to the consuming public, thereby making such horse head protectors economically available to the buying public.

Still yet another object of the present invention is to provide a new and improved horse head protector which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
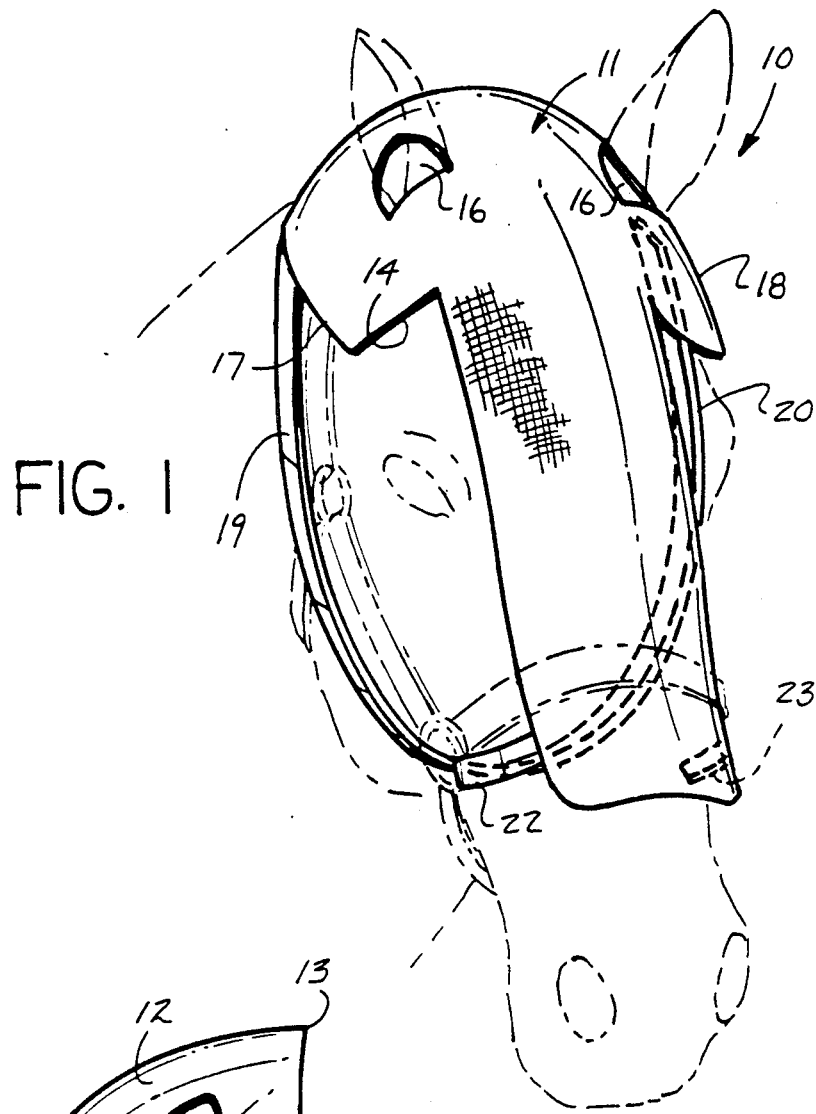
FIG. 1 is an isometric illustration of the invention.
Figure 2:
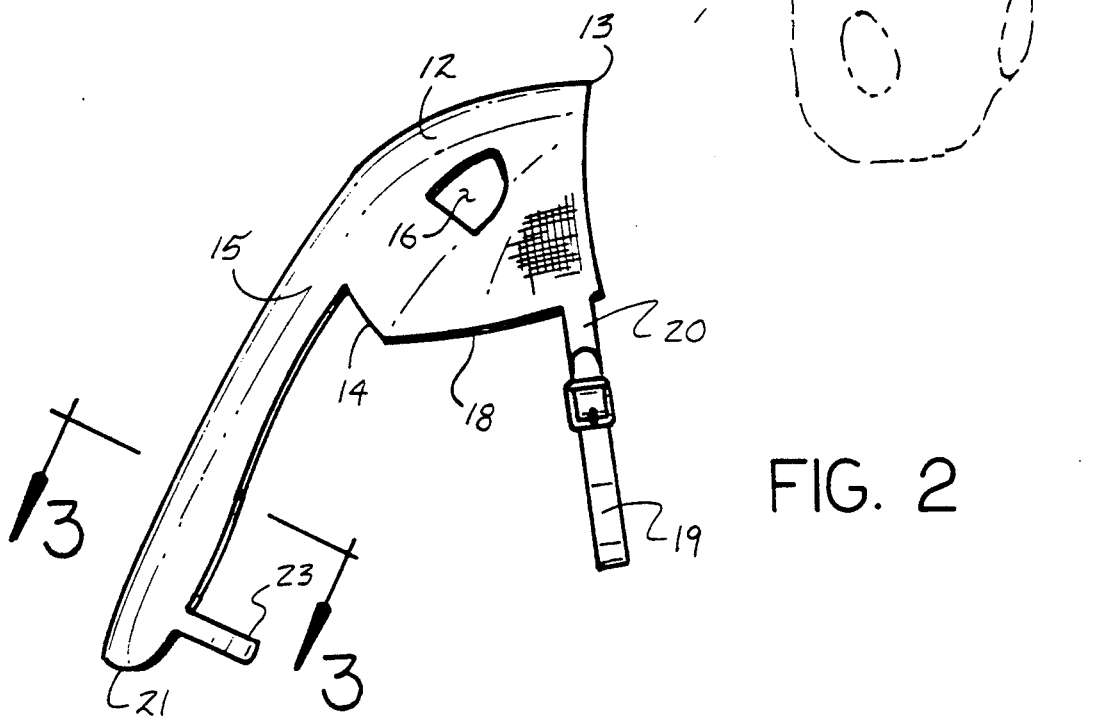
FIG. 2 is an orthographic side view of the invention.
Figure 3:
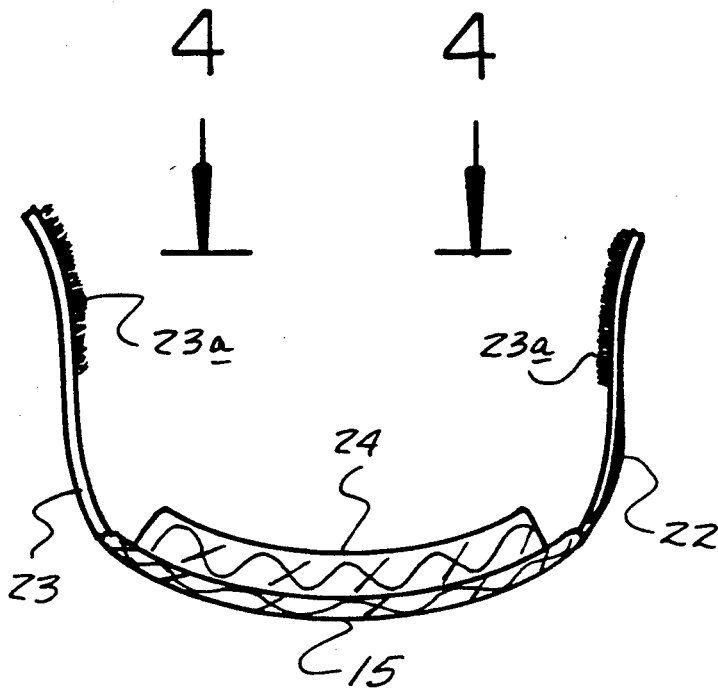
FIG. 3 is an orthographic view, taken along the lines 3—3 of FIG. 2 in the direction indicated by the arrows.
Figure 4:
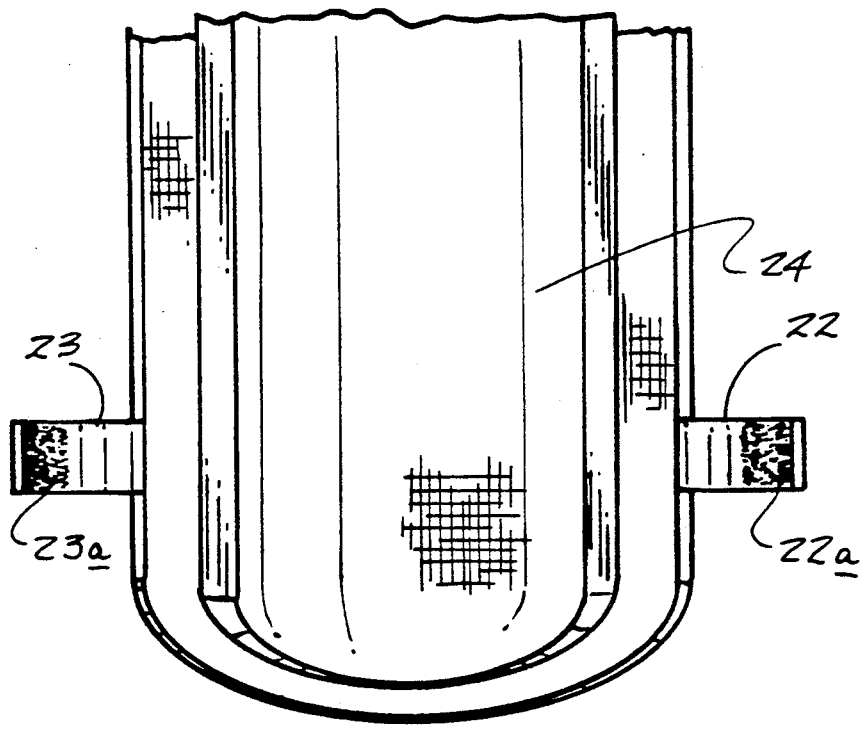
FIG. 4 is an orthographic view, taken along the lines 4—4 of FIG. 3 in the direction indicated by the arrows.

With reference now to the drawings, and in particular to FIGS. 1 to 8 thereof, a new and improved horse head protector embodying the principles and concepts of the present invention and generally designated by the reference numeral 10 will be described.

More specifically, the horse head protector 10 of the instant invention essentially comprises a primary flexible web 11 of a shape retentive material typically formed of a leather, a polymeric, and the like. Typically, leather is preferred relative to its porous, fluid and air transmissive qualities, but any suitable material relative to affording protection relative to the horse's head, as indicated in FIG. 1, is available. Relative thickness of such a primary flexible web 11 is subject to the material, wherein one-sixteenth of an inch of material is desired but may vary relative to the protective qualities of such material employed. The flexible web 11 includes a convex head web 12 having an arcuate first end 13 spaced from an arcuate second end 14 that are coextensive relative to one another, and including respective head web first and second sides 17 and 18 extending between the first and second ends 13 and 14. A convex snout web 15 extends from the second end 14 and canted from the second end towards the concave interior surface of the head web 12 to enhance the snout web positioning upon the horse's facial region between the eyes extending towards the horse's snout portion, as indicated in FIG. 1. The snout web 15 includes a free end 21 that is oriented medially of the second end 14 to medially orient the snout web relative to the second end 14 as it projects therefrom. The head web includes a plurality of spaced ear receiving openings 16, with one of said openings positioned adjacent a respective head web first and second side 17 and 18. First and second straps 19 and 20 are secured to the respective first and second sides 17 and 18 for securement about a horse's head. The snout web includes respective third and fourth straps 22 and 23 secured to an individual snout web side 25, wherein the third and fourth straps 22 and 23 include respective first and second hook and loop fastener patches 22a and 23a respectively for securement relative to one another about the individual's horse's head, or alternatively securable to bridle structure, as indicated in phantom in FIG. 1. Alternative fastening structure relative to securement of the straps 19, 20, 22, and 23 may be provided such as buckles, hook and loop fastener structure, and the like. A cushion layer 24 is secured and mounted to the concave interior surface of the snout web 15, as indicated in the FIGS. 3 and 4, to enhance comfort in the mounting to the horse's facial region.

Figure 5:
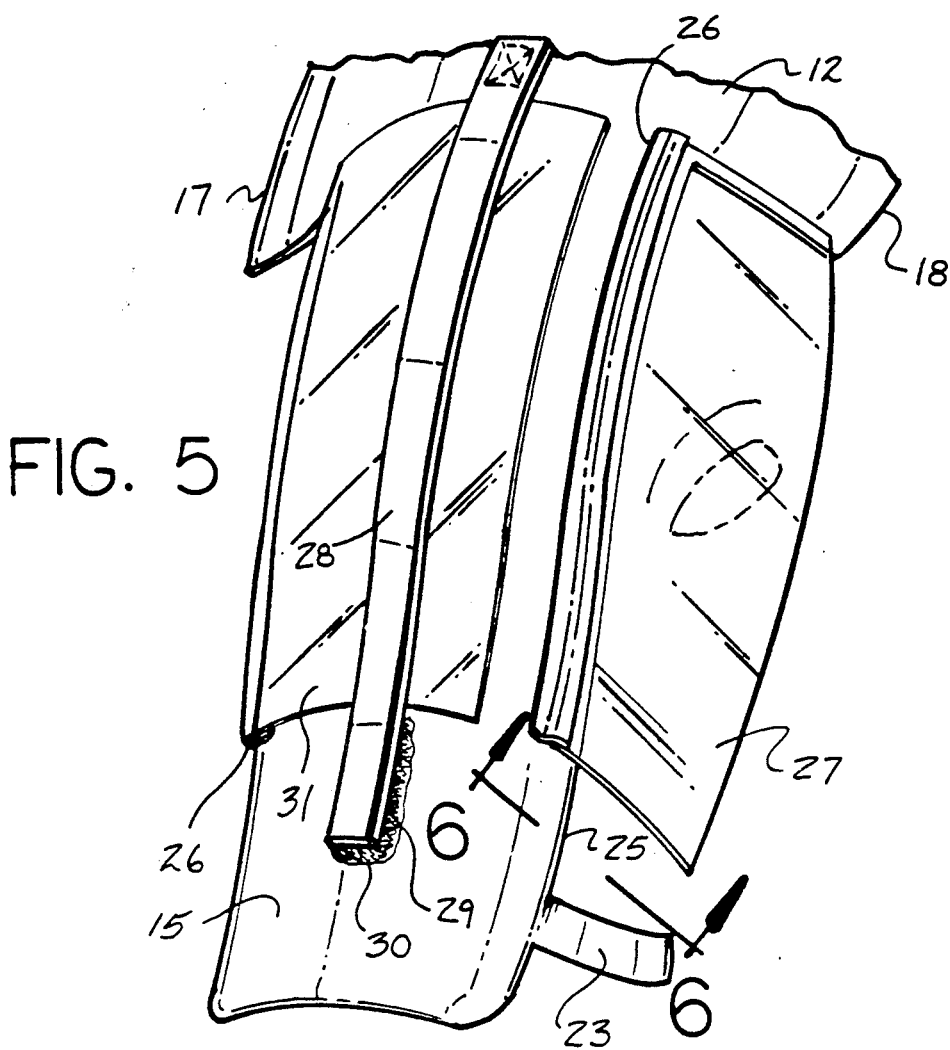
FIG. 5 is an isometric illustration of a modified aspect of the invention.
Figure 6:
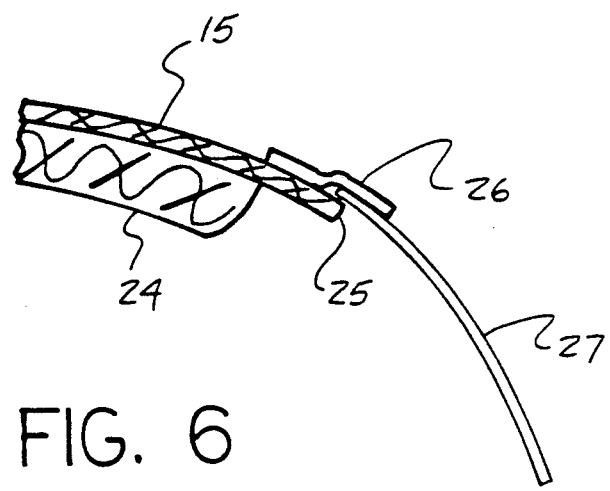
FIG. 6 is an orthographic view, taken along the lines 6—6 of FIG. 5 in the direction indicated by the arrows.
Figure 7:
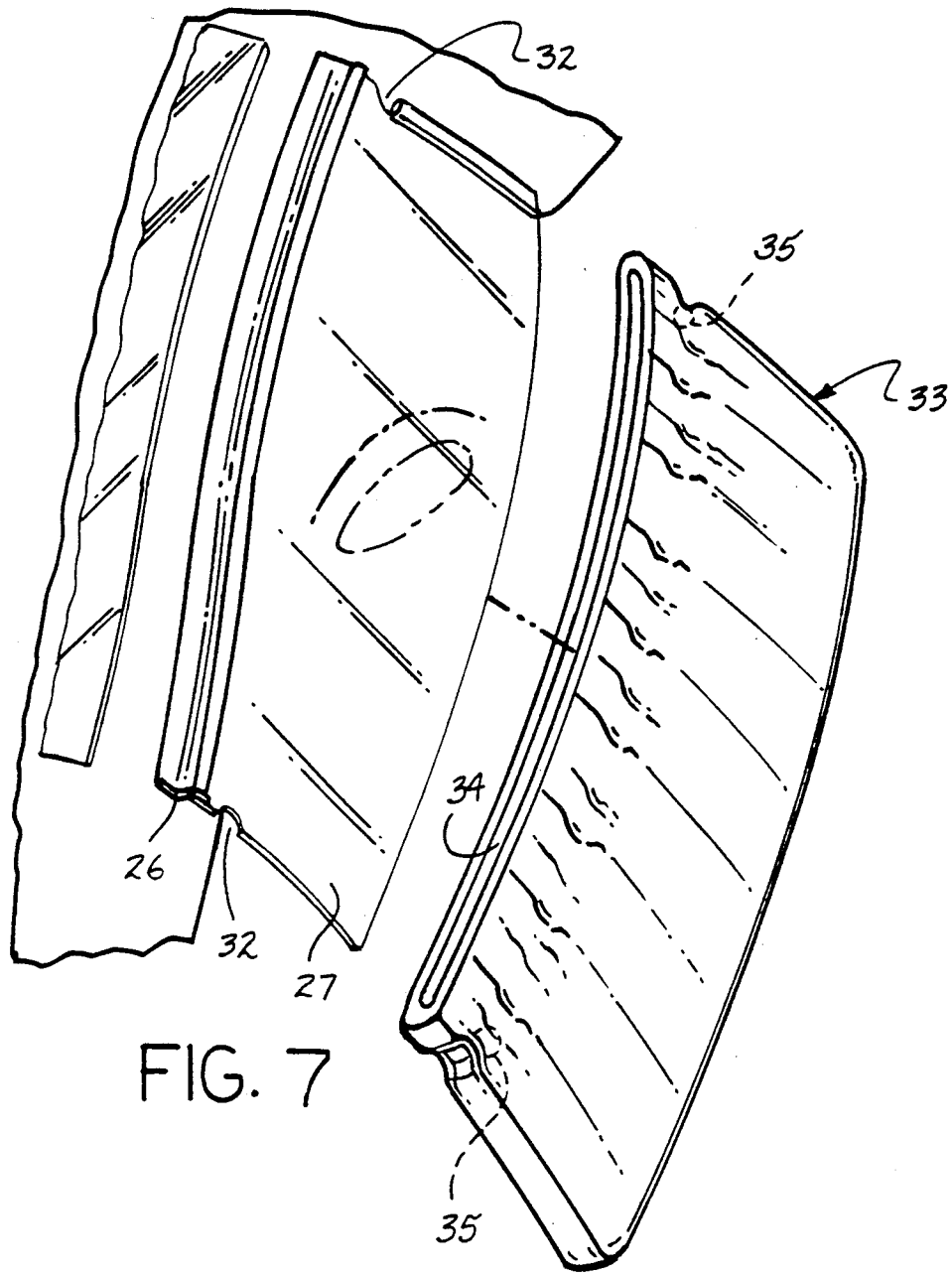
FIG. 7 is an isometric illustration arranged to include an opaque covering relative to the transparent shield structure.
Figure 8:
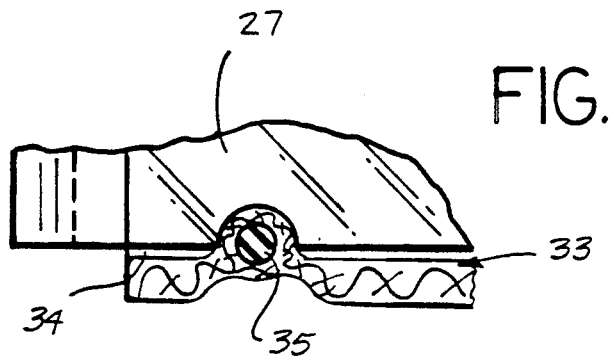
FIG. 8 is an orthographic cross-sectional illustration of the securement of the opaque shield portion relative to the transparent shield portion.

The FIG. 5 indicates the use of fastening means 26 indicated as the spring biased flange 26, where it is understood that various mechanical and adhesive fastening means may be employed if desired as alternatives. An individual fastening means 26 is directed along the respective snout web sides 25. The fastening means 26 is arranged to secure respective transparent eye shield 27 relative to each of the head web first and second sides 17 and 18 to extend from each respective side an thereby provide individual fastening means relative to each of the first and second sides 17 and 18. A transparent eye shield 27 is arranged to afford protection of the horse's eyes if such optional protection is desired. A snout web strap 28 is also optionally afforded hingedly mounted at a junction of the head web 12 to the snout web 15 extending medially of the snout web sides 25 utilizing a snout web strap hook and loop fastener patch 29 arranged for securement to a snout web connecting hook and loop fastener patch 30 mounted to the snout web to permit securement and positioning of various informational sheets 31 as desired relative to an individual horse.

In situations where the horse's eyes are desired to be blinded for calming of the horse, an opaque pocket member 33 is provided (see FIGS. 7 and 8) arranged for receiving and securement to the individual transparent eye shield 27. To this end, the eye shield 27 is arranged to include eye shield spaced recesses 32 at opposed ends of the eye shield 32, wherein the opaque pocket member 33 having a pocket member cavity 34 to receive the transparent eye shield 27 therewithin further includes resilient rib members 35 orthogonally oriented relative to each of the transparent eye shield sides to arrange for reception within an individual recess 32 for securement of the pocket member 33 to the transparent eye shield 27.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A horse head protector, comprising,
    a primary flexible web of a shape retentive material, including a convex head web and a convex snout web, with the head web having an arcuate first end spaced from an arcuate second end, and a head web first side spaced from a head web second side, and
    the convex snout web integrally mounted to the head web arcuate second end extending therefrom, with the convex head web having a concave interior surface, and the convex snout web having a snout web concave interior surface, wherein the snout web includes a snout web free end spaced from the head web arcuate second end and canted towards the head web concave interior surface, and
    the head web first side includes a first strap, the head web second side having a second strap, with the first strap and the second strap spaced adjacent to the head web arcuate first end, and the snout web includes a plurality of snout web spaced sides, and each of the spaced sides having a snout web strap, and each snout web strap extending from the snout web adjacent to the snout web free end, and the convex head web includes a plurality of ear receiving openings directed through the convex head web, wherein one of said ear openings is positioned adjacent to said head web first side, and a further one of said ear openings is adjacent to the head web second side, and a cushion layer mounted to the snout web concave interior surface, and fastening means mounted to at least one of said snout web sides, with a transparent eye shield, with the fastening means arranged for securement of said transparent eye shield relative to said snout web, and the transparent eye shield includes eye shield spaced end edges, and each end edge having a recess, and an opaque pocket member, the pocket member having a cavity, with the cavity arranged for receiving the eye shield therewithin, and the cavity including spaced resilient rib members, wherein each of said rib members is arranged for reception within one of said recesses to secure said pocket member to said transparent eye shield.

2. A horse head protector as set forth in claim 1 including a snout web strap hingedly mounted to the snout web in adjacency to the convex head web, with the snout web strap having a strap hook and loop fastener patch, with the snout web having a snout web hook and loop fastener patch, with the snout web hook and loop fastener patch arranged for securement to the strap hook and loop fastener patch, with an information sheet arranged for mounting between said snout web strap and said snout web.

* * * * *